United States Patent [19]
Carbine et al.

[11] Patent Number: 5,668,985
[45] Date of Patent: Sep. 16, 1997

[54] DECODER HAVING A SPLIT QUEUE SYSTEM FOR PROCESSING INTSTRUCTIONS IN A FIRST QUEUE SEPARATE FROM THEIR ASSOCIATED DATA PROCESSED IN A SECOND QUEUE

[75] Inventors: Adrian L. Carbine, Hillsboro; Gary L. Brown, Aloha; Bradley D. Hoyt, Portland; Donald D. Parker, Portland; Rajesh Kumar, Portland, all of Oreg.

[73] Assignee: Intel Corporation, Santa Clara, Calif.

[21] Appl. No.: 204,992

[22] Filed: Mar. 1, 1994

[51] Int. Cl.[6] .................................................. G06F 9/22
[52] U.S. Cl. .................................... 395/595; 395/389
[58] Field of Search ........................... 395/375, 250, 395/484, 387, 388, 389, 598, 595; 364/925.5

[56] References Cited

U.S. PATENT DOCUMENTS

| | | | |
|---|---|---|---|
| 4,394,736 | 7/1983 | Bernstein et al. | |
| 4,399,505 | 8/1983 | Druke et al. | |
| 4,591,972 | 5/1986 | Guyer et al. | |
| 4,598,365 | 7/1986 | Boothroyd et al. | 395/250 |
| 4,745,544 | 5/1988 | Renner et al. | |
| 4,928,223 | 5/1990 | Dao et al. | |
| 5,023,776 | 6/1991 | Gregor | 395/250 |
| 5,222,244 | 6/1993 | Carbine et al. | 395/800 |
| 5,289,584 | 2/1994 | Thome et al. | 395/325 |
| 5,325,495 | 6/1994 | McLellan | 395/375 |
| 5,371,864 | 12/1994 | Chuang | 395/375 |
| 5,471,591 | 11/1995 | Edmondson et al. | 395/375 |
| 5,490,255 | 2/1996 | Rawlinson et al. | 395/375 |

OTHER PUBLICATIONS

Johnson, Mike, "Superscalar Microprocessor Design", *Prentice Hall, Inc.*, 1991, pp. 1–287.
Popescu, et al., "The Metaflow Architecture", IEEE, 1991, pp. 10–13 and pp. 63–73.

*Primary Examiner*—Richard L. Ellis
*Attorney, Agent, or Firm*—Blakely, Sokoloff, Taylor & Zafman

[57] ABSTRACT

A split queue system for a decoder that supplies one or more micro-operations and data associated with the micro-operations. A main queue is coupled to receive one or more micro-operations from the decoder, and supply it to a next processing stage to provide a process micro-operation. A shadow queue is coupled to receive data associated with the micro-operation, in the same cycle that the micro-operation is supplied to the main queue. A control circuit is coupled to the main queue for issuing micro-operation from the main queue into the next processing stage in a first cycle, and in a second cycle issuing, the micro-operation therefrom. Also in the second cycle, the control circuit issues the data associated with the micro-operation from the shadow queue, so that the data is synchronized with its associated processed micro-operation.

15 Claims, 14 Drawing Sheets

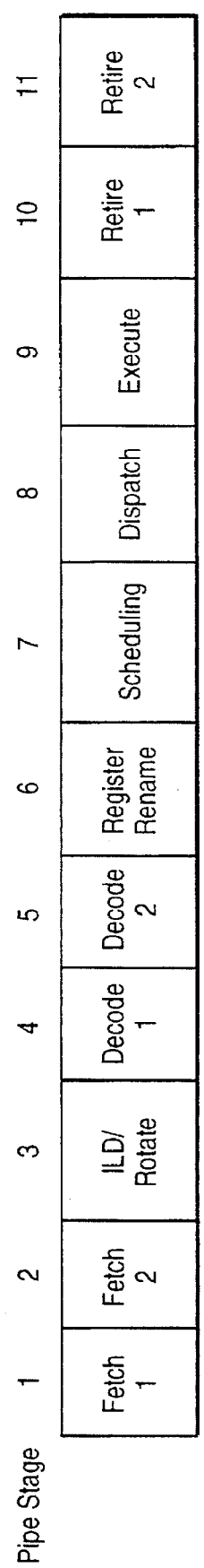

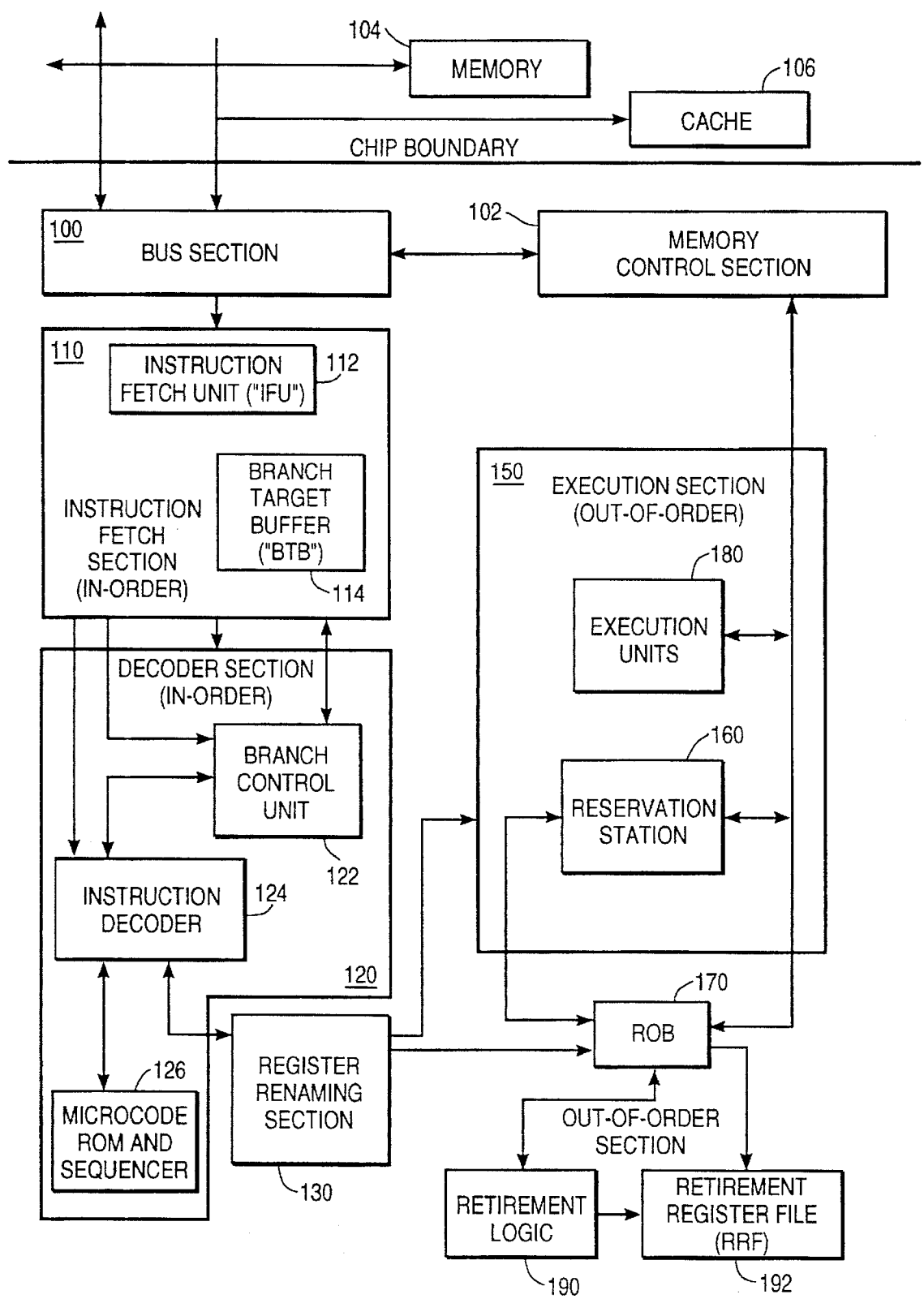
FIG_2

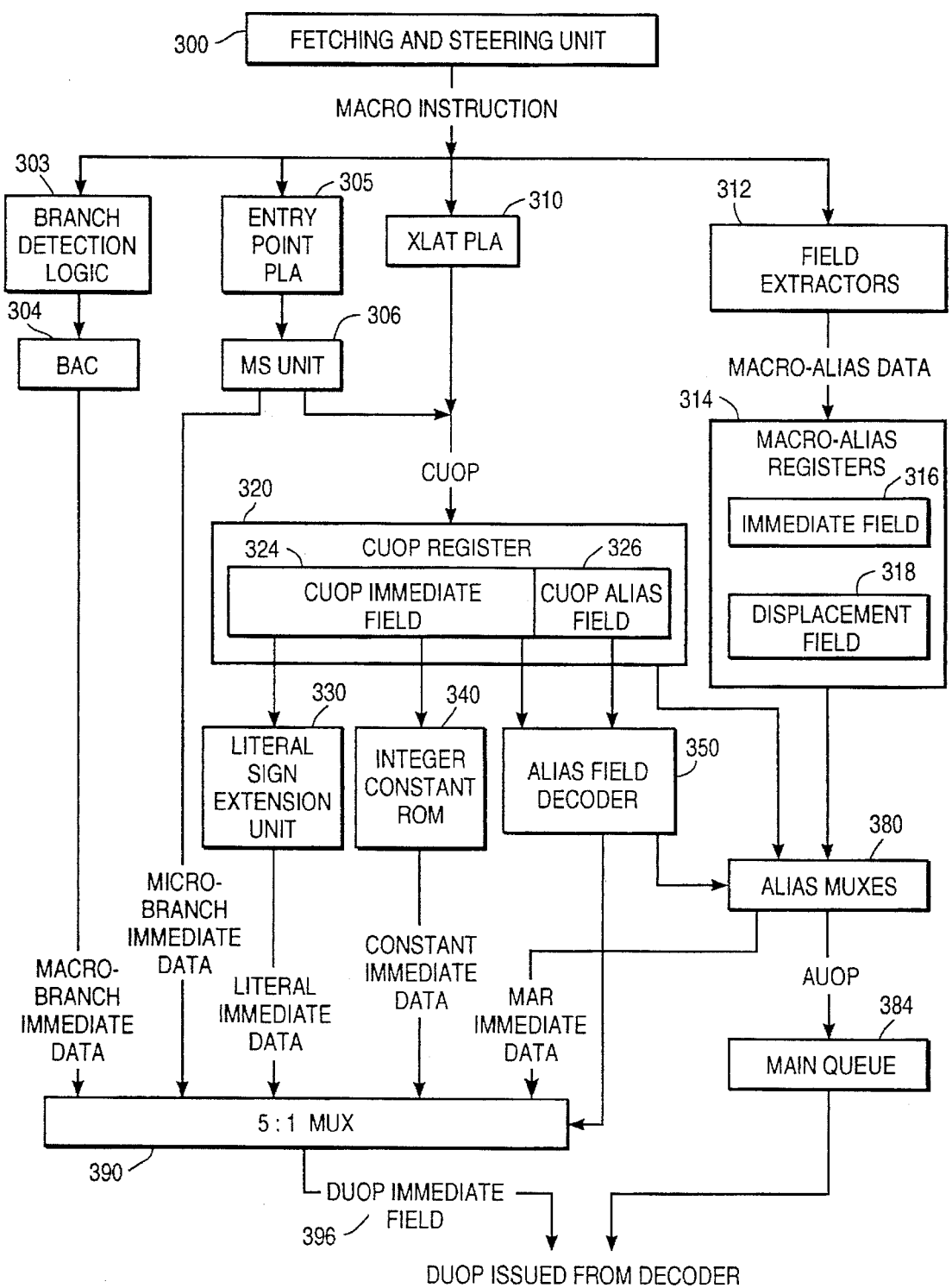
FIG_3

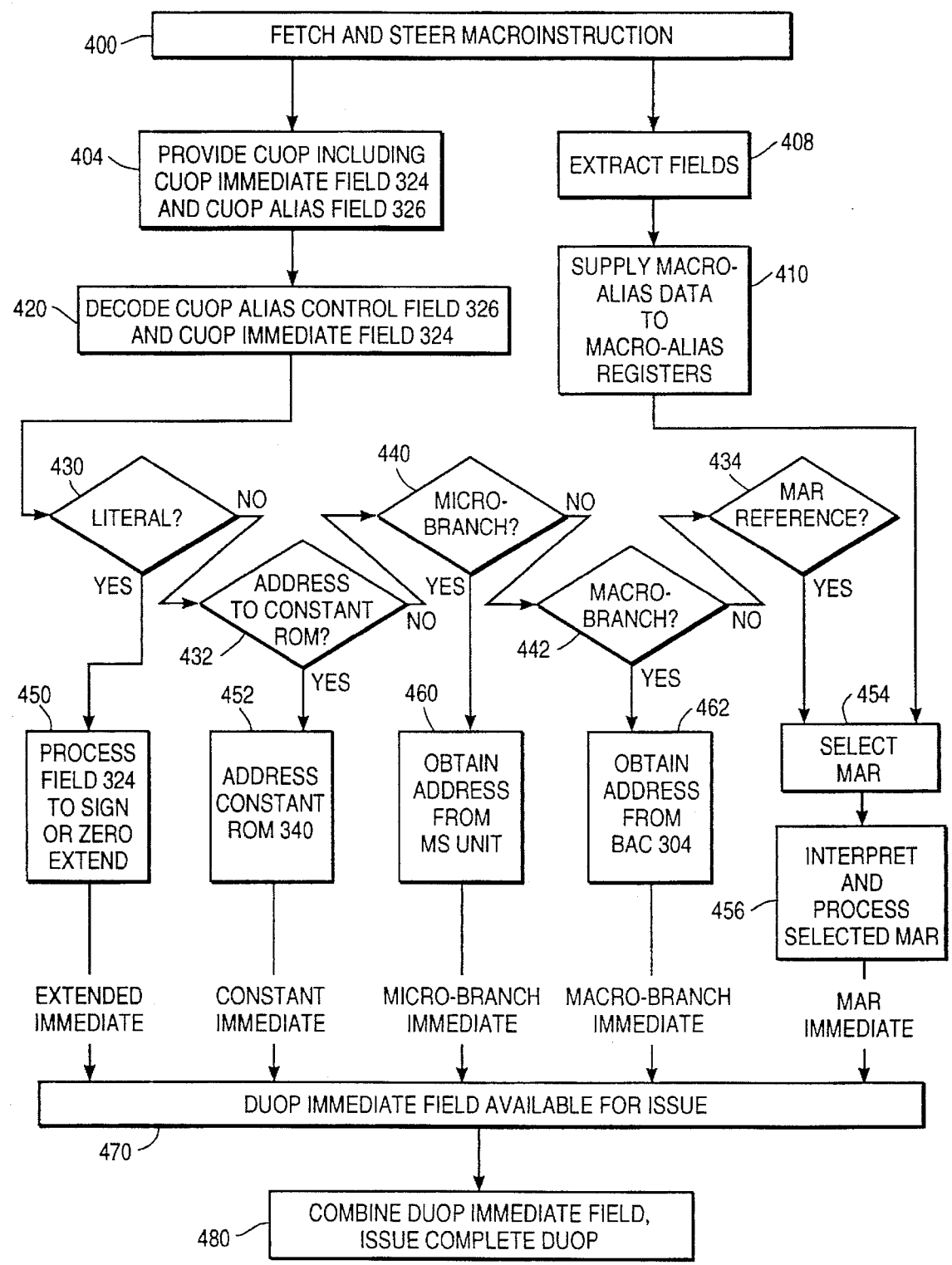
FIG_4

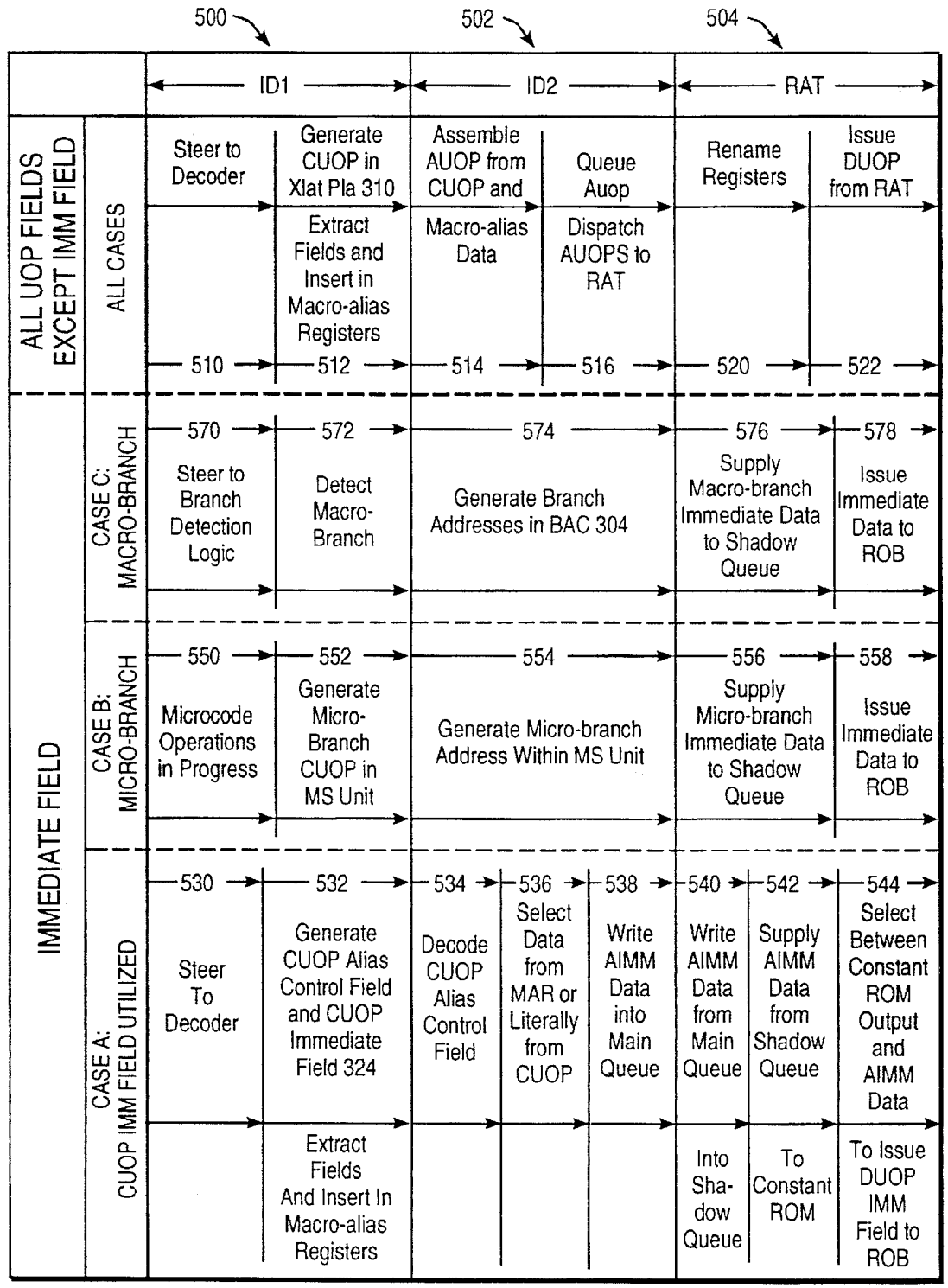
FIG_5

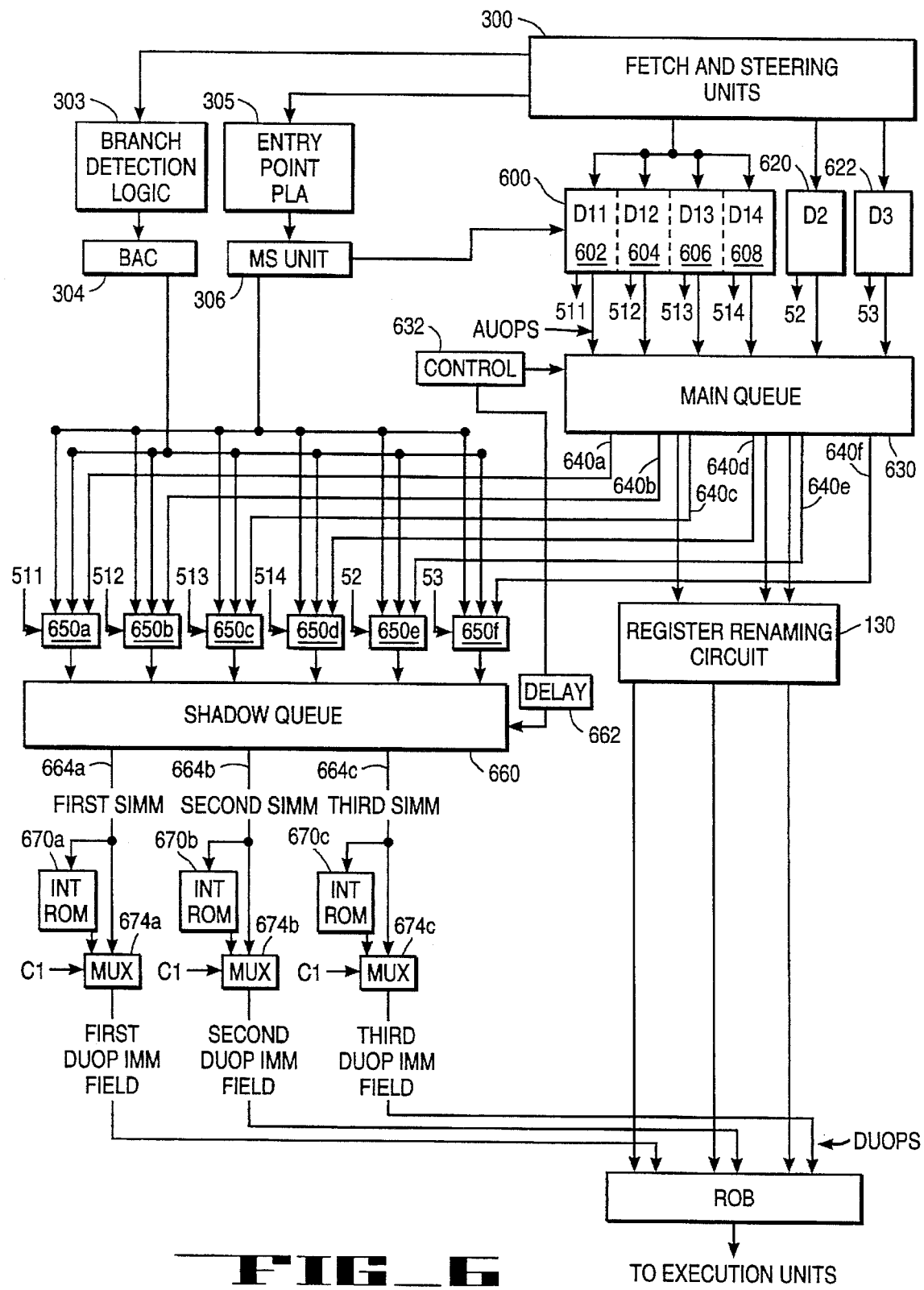
FIG_6

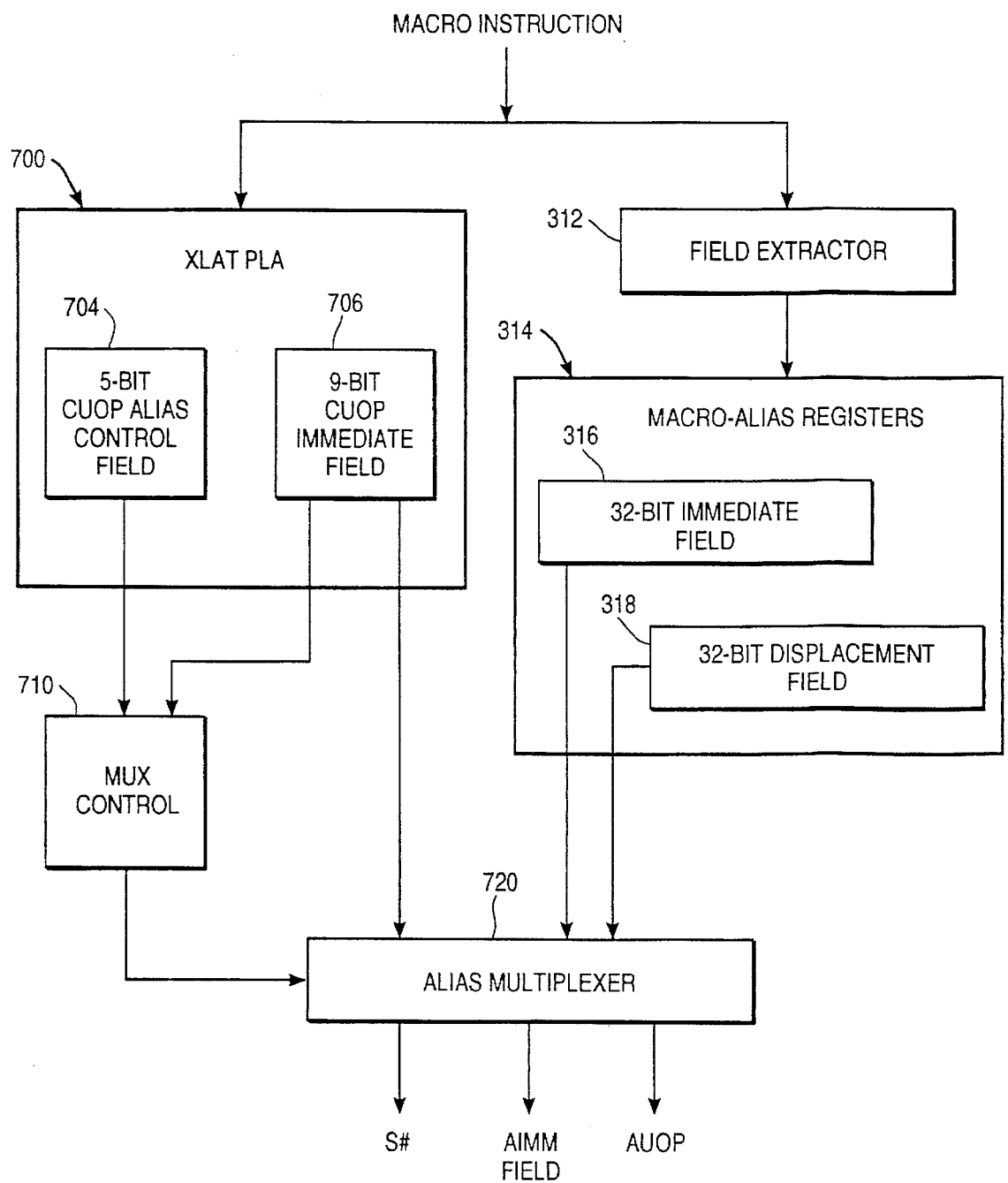
FIG_7

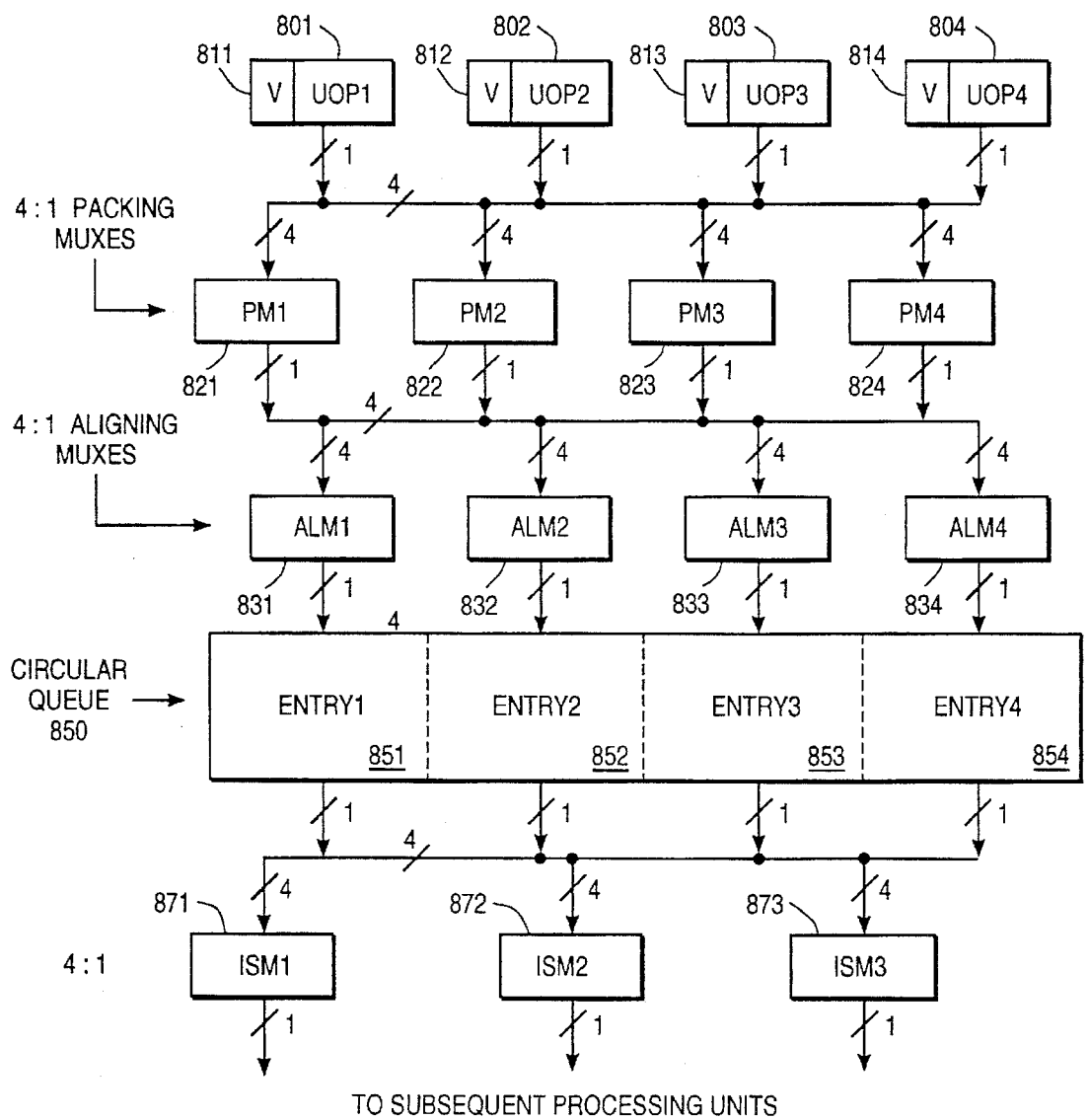
FIG_8

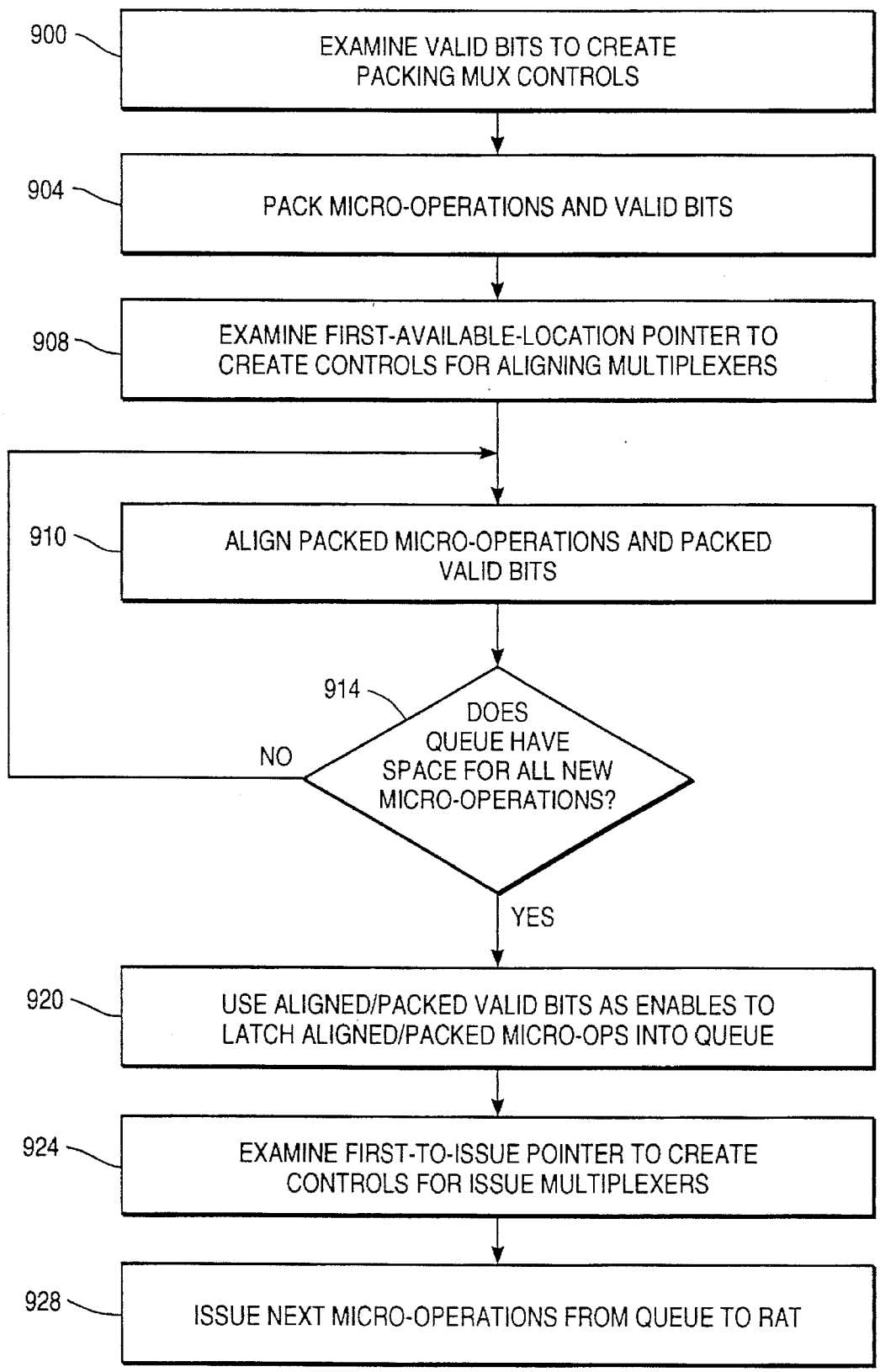

|  |  | 1ST-TO-ISSUE ↓ | NEXT AVAILABLE ↓ |  |
|---|---|---|---|---|
| INITIAL STATE |  |  |  |  |
| QUEUE ENTRIES | - | Z | - | - |
| VALID BITS | 1 | 0 | 1 | 1 |
| UOPS | A | B | C | D |
| PACKING OPERATIONS |  |  |  |  |
| PACKING MUX CONTROL | 1000 | 0010 | 0001 | 0001 |
| PACKED UOPS | A | C | D | D |
| PACKED VALID BITS | 1 | 1 | 1 | 0 |
| ALIGNING OPERATIONS |  |  |  |  |
| ALIGNING MUX CONTROL | 0010 | 0001 | 1000 | 0100 |
| ALIGNED UOPS | D | D | A | C |
| ALIGNED VALID BITS | 1 | 0 | 1 | 1 |
| IF SUFFICIENT SLOTS AVAILABLE, LATCH VALID UOPS INTO QUEUE | D | Z | A | C |
| ISSUE MUX CONTROL | 0100 | 0010 | 0001 |  |
| ISSUED UOPS | Z | A | C |  |
| RESULTANT QUEUE STATE | D<br>↑<br>1ST-TO-ISSUE | -<br>↑<br>NEXT AVAILABLE | - | - |

FIG_10

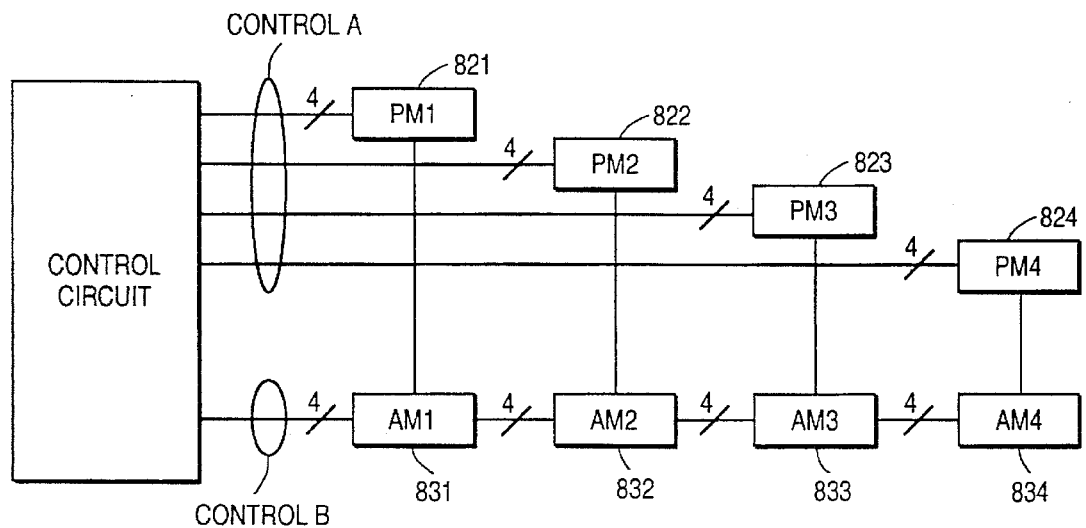
FIG_11
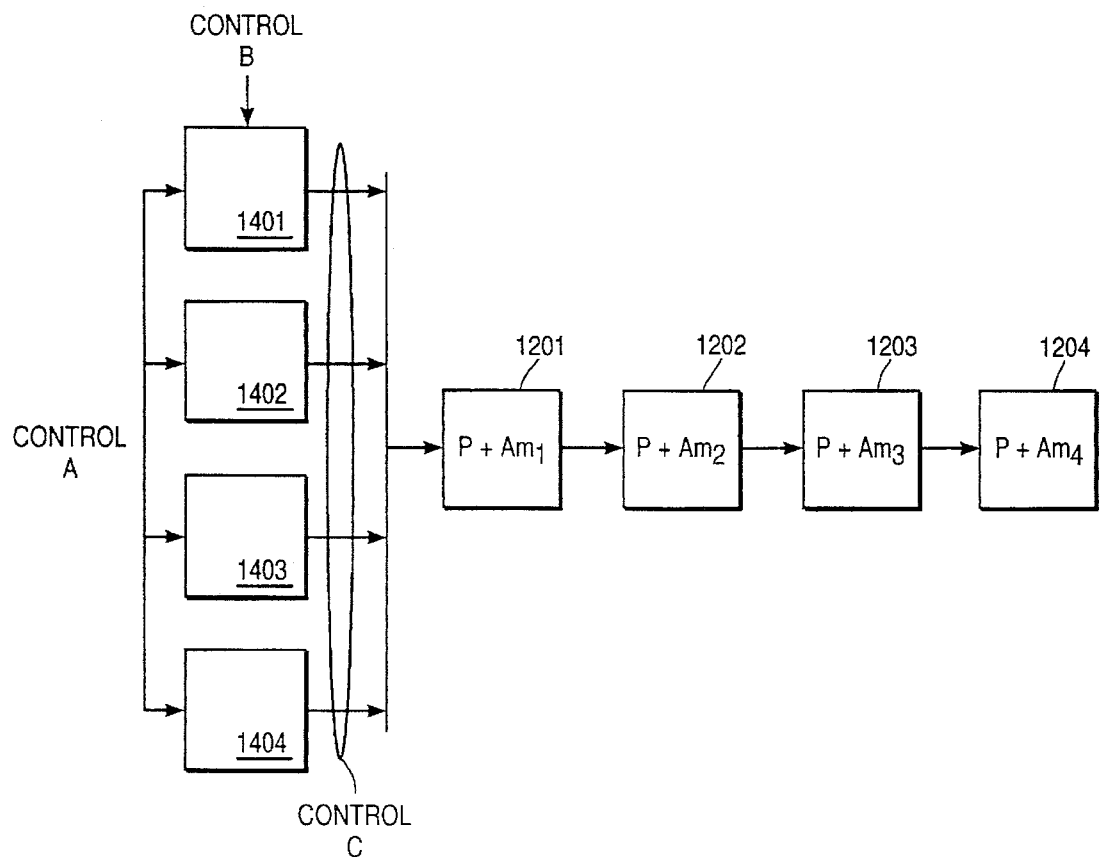
FIG_14

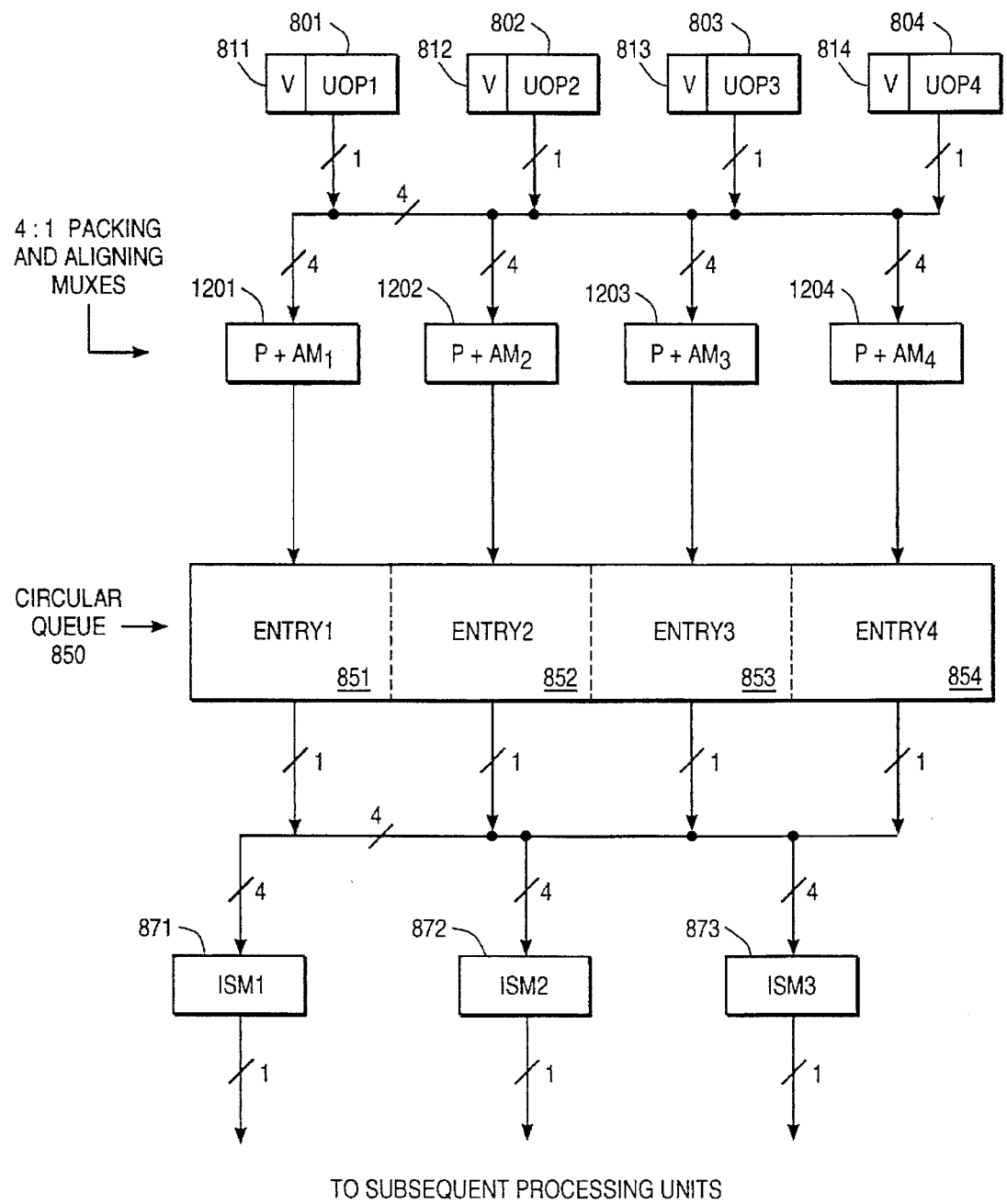
FIG_12

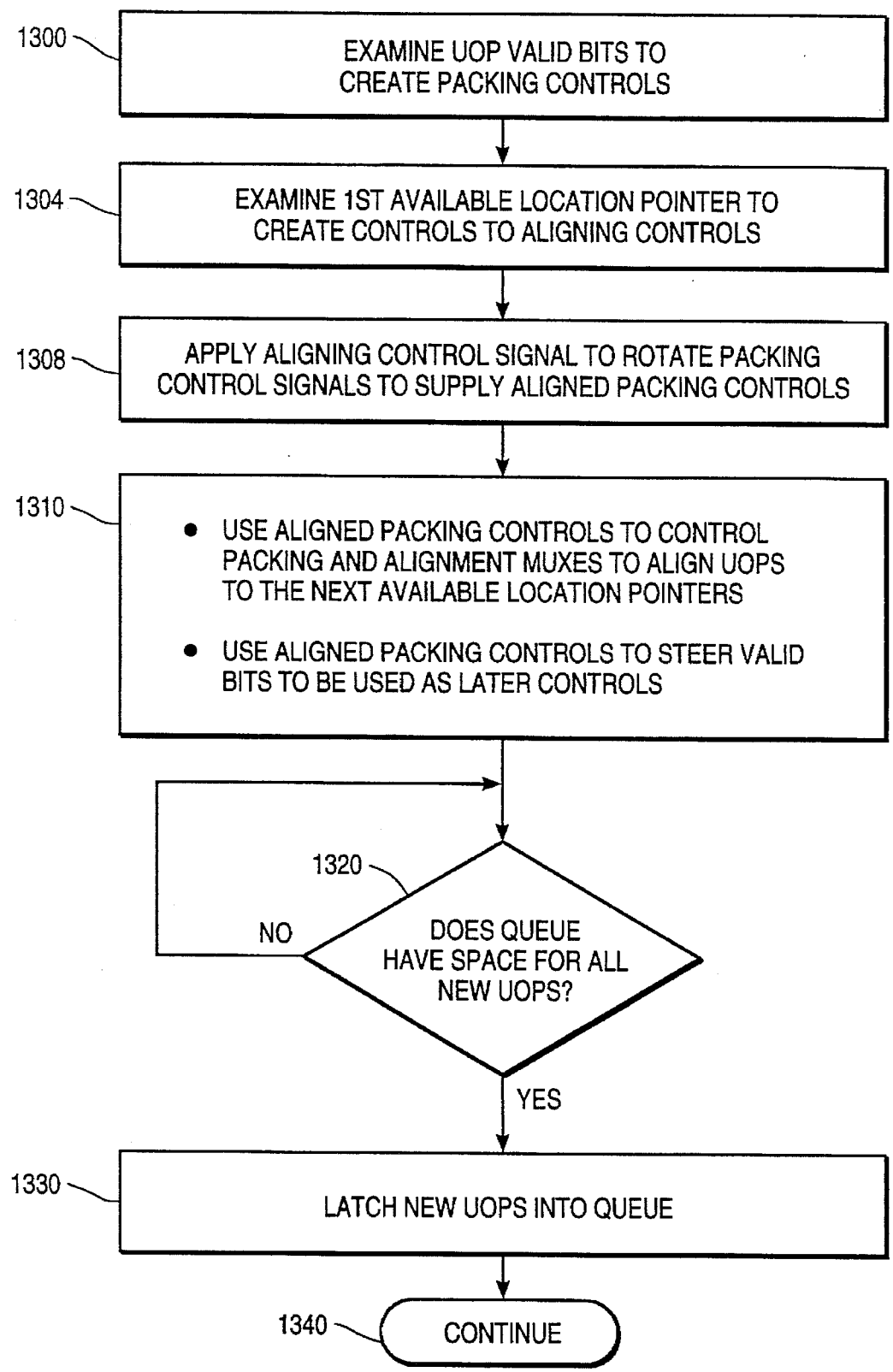
FIG_13

| | | | | |
|---|---|---|---|---|
| INITIAL STATE | | | | |
|    QUEUE ENTRIES | - | Z | - | - |
|    VALID BITS | 1 | 0 | 1 | 1 |
|    UOPS | A | B | C | D |
| PACKING AND ALIGNING OPERATIONS | | | | |
|    PACKING CONTROL (SIGNAL A) | 1000 | 0010 | 0001 | 0001 |
|    ALIGNING CONTROL (SIGNAL B) | 0010 | 0001 | 1000 | 0100 |
|    P + A CONTROL (SIGNAL C) | 0001 | 0001 | 1000 | 0010 |
|    P + A UOPS | | | | |
|    P + A VALID BITS | 1 | 0 | 1 | 1 |
| IF SUFFICIENT SLOTS AVAILABLE, LATCH VALID UOPS INTO QUEUE | D | Z | A | C |
| ISSUE MUX CONTROL | 0100 | 0010 | 0001 | |
| ISSUED UOPS | Z | A | C | |
| RESULTANT QUEUE STATE | D<br>↑<br>1ST-TO-ISSUE | -<br>↑<br>NEXT AVAILABLE | - | - |

FIG_15

DECODER HAVING A SPLIT QUEUE SYSTEM FOR PROCESSING INTSTRUCTIONS IN A FIRST QUEUE SEPARATE FROM THEIR ASSOCIATED DATA PROCESSED IN A SECOND QUEUE

CROSS-REFERENCE TO RELATED APPLICATIONS

Cross-reference is made to the following commonly assigned patent applications: Pat. No. 5,581,717, entitled "A Decoding Circuit and Method Providing Immediate Data for a Micro-operation Issued from a Decoder", filed Mar. 1, 1994 and issued Dec. 3, 1996 by Boggs et al., and Ser. No. 08/204,597, entitled "An Output Queue for Multiple Operations Received Simultaneously from a Parallel Decoder", filed Mar. 1, 1994, by Brown et al., now abandoned which are incorporated by reference herein.

BACKGROUND OF THE INVENTION

1. Field of the Invention

The present invention relates to decoders that provide micro-operations together with the associated data, such as a branch address, that requires additional processing time.

2. Description of Related Art

Computers process information by executing a sequence of instructions, which may be supplied from a computer program written in a particular format and sequence designed to direct the computer to operate a particular sequence of operations. Most computer programs are written in high level languages such as FORTRAN or "C" which are not directly executable by the computer processor. These high level instructions are translated into instructions, termed "macroinstructions" herein, having a particular format suitable for the processor in which they will be executed. Within the processor, macroinstructions are supplied to a decoder, which decodes them into micro-operations and then issues them to subsequent units for execution.

The micro-operations issued from the decoder have a format particularly suited for those execution units. For example, an issued micro-operation may include opcode fields, immediate fields, one or two source fields, and a destination field, among others.

In order to issue an immediate field for micro-operation, the decoder must be able to direct data from a number of different sources into the immediate field when the micro-operation is issued. A macro-opcode may implicitly specify an immediate. For example, the INC (increment by one) macroinstruction can be implemented with an ADD micro-operation that adds the immediate "one" to the contents of a register. In this case, the macroinstruction implies a literal of "one", which is immediate data that must be inserted into the ADD micro-operation. Other immediate data includes a branch target address and a fall-through address that are provided by a branch address calculation mechanism. In a decoder having an alias mechanism, still another source of data is that which has been extracted explicitly from a macroinstruction. For example, a 32-bit displacement or 32-bit immediate value specified in macroinstructions can be extracted and stored in an alias register.

Some types of data require additional processing before they can be made available for issuance. For example, a branch address calculation can consume so much time that it is difficult to issue it at the same time as the remainder of the micro-operation. Other types of data may also require further processing. In order to avoid delaying the micro-operation and the remainder of data in the pipeline, it would be an advantage to provide a mechanism that allows further operation on later data by taking advantage of situations when the late data field is not needed by the subsequent processing pipe stage, so that this data will have additional time within which to complete its processing. It is also advantageous if this data can then later be synchronized with its associated micro-operation. Such a system would also be useful in a superscalar micro-operation issue machine.

SUMMARY OF THE INVENTION

The present invention provides a split queue circuit and method that provides the additional processing time necessary to process predetermined data fields in a critical speed path in a decoder without delaying the issue of the micro-operation and the remainder of the data.

The decoder supplies one or more micro-operations and associated data to a split queue system. A main queue is coupled to receive a micro-operation from the decoder. A shadow queue is coupled to receive the data associated with the micro-operation from the decoder. A next processing stage is coupled to receive the micro-operation issued from the main queue. The next processing stage processes the micro-operation to provide a processed micro-operation. A control circuit coupled to the main queue and the shadow queue for issuing said micro-operation from said main queue in a first cycle and, in a second cycle, issuing the data associated with the micro-operation from the shadow queue, so that the data is then synchronized with its associated processed micro-operation after the second cycle.

The described system advantageously provides an additional processing cycle for data not needed by the next processing stage. Particularly, the shadow queue is useful for the receiving data such as branch address calculations that consume substantial time, and could be useful for other processed data.

Therefore, the above invention provides advantages of allowing an additional clock cycle for processing data such as long address calculations without an additional clock delay, and synchronizes data with its associated micro-operation, all for a more efficient utilization of processing time. It is also useful for maintaining synchronization of multiple micro-operations issued simultaneously in a superscalar issue machine.

In one advantageous embodiment, a constant ROM is coupled to the output of the shadow queue to receive associated data, and response thereto supplies a constant output. A control field is associated with said data, and responsive thereto, a selection circuit selects one of the constant output and said data which is subsequently matched with its associated processed micro-operation. One advantage of this configuration is reduction in the size and number of constant ROMs. Particularly, by positioning the constant ROMs after the shadow queue, the number of constant ROMs is limited to the number of outputs issued from the shadow queue, which in the described embodiment is three, rather than the number of inputs going to the shadow queue, which in the described embodiment is six.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and therefore resort to the claims is necessary to determine the inventive subject matter.

BRIEF DESCRIPTION OF THE DRAWINGS

FIG. 1 is a diagram of pipelined instruction flow in a microprocessor including an out-of-order section.

FIG. 2 is a block diagram of a processor including an out-of-order execution section.

FIG. 3 is a block diagram of one implementation of an aliased decoder in which an initially decoded Cuop field can be interpreted with one of several interpretations, and furthermore where said Cuop can specify the source of the immediate data that will be eventually issued from the decoder.

FIG. 4 is a flow chart illustrating operations to select a Duop immediate field to be issued, and to interpret the Cuop immediate field.

FIG. 5 is a timing diagram illustrating operations to process Cuops in parallel with the immediate field.

FIG. 6 is a circuit diagram illustrating one preferred implementation of the immediate data bypass circuitry in shadow queue.

FIG. 7 is a diagram of one of the decoders in the preferred implementation.

FIG. 8 is a diagram of one embodiment of a system for packing, aligning and queuing micro-operations received from a decoder.

FIG. 9 is a flow chart illustrating operations of the embodiment of FIG. 8 for packing, aligning, and queuing micro-operations.

FIG. 10 is an example of operations to pack, align and issue several micro-operations in accordance with the embodiment of FIGS. 8 and 9.

FIG. 11 is a diagram of the control configuration useful for the embodiment described with reference to FIGS. 8, 9, and 10.

FIG. 12 is a diagram of implementation of the preferred embodiment in which the packing multiplexers and aligning multiplexers are combined to a single level of multiplexers, designated as packing and aligning multiplexers.

FIG. 13 is a flow chart illustrating operation of the embodiment of FIG. 12 in which the packing and aligning multiplexers are combined in one level.

FIG. 14 is a diagram illustrating the control signals and control circuitry for the embodiment illustrated in FIGS. 12 and 13.

FIG. 15 is an example of operation of the one-level mutiplexer embodiment of FIG. 12.

DETAILED DESCRIPTION OF THE PREFERRED EMBODIMENT

FIGS. 1 through 15 of the drawings disclose various embodiments of the present invention for purposes of illustration only. One skilled in the art will readily recognize from the following discussion that alternative embodiments of the structures and methods illustrated herein may be employed without departing from the principles of the invention. The following description may include specific numbers and quantities associated with the apparatus and method described therein. For example, the processing apparatus and methods described herein can be practiced in a single microprocessor chip, or multiple chips, or in software. The chips may be made of silicon or other semiconductor material Also, it should be apparent to one skilled in the art that the numbers and quantities utilized herein for illustrative purposes, for example the number of bits in a particular field can vary between embodiments.

Discussion of Variable Length Instructions and Prefixes

The system described herein is particularly useful for decoding a sequence of variable length instructions that form a portion of a computer program. In the preferred implementation, the instructions supplied to the decoder (termed "macroinstruction") have the well-known format of the INTEL instruction set which is described, for example, in detail in the i486™ *Programmers Reference Manual*, 1990, Section 2.4, available from INTEL Corporation. In this format, a macroinstruction can be up to fifteen bytes in length.

Each macroinstruction includes at least one opcode byte, which specifies the operation performed by the instruction. The length of an instruction is variable; i.e., the instructions have no set fixed length. For example, in one sequence of instructions, the first instruction may comprise twelve bytes, the second instruction may comprise eight bytes, and the third instruction may comprise two bytes. There are certain format rules; for example, a macroinstruction is divided into sections that may include prefix bytes, followed by opcode bytes, which are followed by operand or other data bytes. The number, and even the existence of certain bytes is unknown with any certainty: the number of prefix bytes in a single macroinstruction may vary from zero to fourteen. The number of opcode bytes ranges from one to three, and the number of operand and other data bytes can vary from zero to eight. Prefixes, as used herein, are described with reference to the INTEL instruction set. Prefixes may include information relating to length of data, and control information regarding code segment override and data segment override. Furthermore, there may be one or more repeat prefixes, which indicate that an instruction is to be repeated a certain number of times. The i486™ *Programmers Reference Manual,* 1990, Section 2.4, "Instruction Format", pages 2–15 and 2–16, includes a complete discussion of the instruction format of the i486™ INTEL instruction set, which includes various prefix bytes available. Also, section 26.2 "Instruction Format" on page 26-2 includes such a discussion.

The decoder described herein is designed to decode the INTEL instruction set, which includes instructions executable in the INTEL microprocessors including the 8086, 8087, 80286, i386™, 80287, i486™ and the Pentium™ microprocessors. It should be apparent however, that the structures described herein could also be used with instruction sets other than the INTEL instruction set. The following description includes circuits and methods suitable for implementation in a microprocessor. It should be recognized, however, that the principles described herein could be utilized in other processors, and other instruction sets, even fixed length instruction sets.

Notation and Nomenclature

The detailed descriptions which follow are presented largely in terms of display images, algorithms, and symbolic representations of operations of data bits within a computer memory. These algorithmic descriptions and representations are the means used by those skilled in the art to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, selected, chosen, modified, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations that may be performed in conjunction with a human operator who can program or initiate those operations. Useful machines for performing the operations of the present invention include general purpose digital computers or other similar devices. In all cases, there should be borne in mind the distinction between the method of operating a computer and the method of computation itself. The methods disclosed herein relate to operating a computer and processing electrical or other physical signals to generate other desired physical signals.

Apparatus is also disclosed herein for performing these operations. This apparatus may be specially constructed for the required purposes as described herein or it may comprise a general purpose computer selectively activated or reconfigured by a computer program stored in the computer. The algorithms presented herein are not inherently related to any particular computer or other apparatus except as otherwise noted. In particular, various general purpose machines may sometimes be used with programs in accordance with the teachings herein, or it may prove more convenient to construct more specialized apparatus to perform the required method steps. The required structure for a variety of these machines will appear from the description given below.

Description of a Pipelined Processor

Reference is first made to FIG. 1, which illustrates a set of pipeline stages of a deeply pipelined processor. In a deeply pipelined processor, the major stages of a pipelined processor such as fetch, decode, and execute, are divided into several substages such that each major stage is pipelined. In the instruction pipeline of FIG. 1, there are eleven pipeline stages, which by present day standards is a long pipeline.

Located at the head of the instruction pipeline illustrated in FIG. 1 are two instruction fetch substages. (Fetch 1 and Fetch 2) The two instruction fetch substages are responsible for continually fetching new instructions for the instruction pipeline. Unconditional branch instructions within the instruction stream prevent the fetch substages from simply fetching sequential instructions. Furthermore, conditional branch instructions in the instruction stream prevent the fetch substages from simply fetching instructions along a predefined path. The instruction fetch substages therefore fetch future instructions without knowing exactly where the program is going.

To fetch future instructions, the fetch substages at the head of an instruction pipeline are implemented with a branch prediction mechanism. The branch prediction mechanism predicts where branch instructions exist in the instruction stream and the outcome of these branch instructions. The instruction fetch unit then fetches the stream of instructions predicted by the branch prediction mechanism.

Overall Description of the Processor

Reference is now made to FIG. 2 which is a block diagram of a microprocessor that implements an out-of-order execution section. The blocks within the microprocessor chip include a bus section 100 and a memory control section 102 coupled thereto. A memory 104 and cache 106 are coupled to the bus section 100. Thus, the memory control section 102 can control the bus section 100 to retrieve information from the memory 104 or the cache 106. The memory 104 may be any type of external memory, such as Random Access Memory ("RAM"), disk drives, or other storage media. The cache 106 is utilized to store frequently used instructions or data. The cache may be located on-chip or, as illustrated, off-chip.

The blocks within the chip include an instruction fetch section 110 that fetches instructions in sequential order (i.e., "in-order"). The instruction fetch section 110 includes an instruction fetch unit ("IFU") 112 and a branch target buffer ("BTB") 114 that operates with control logic to perform branch predictions. Any conventional branch prediction mechanism may be used. In one implementation, the branch prediction mechanism may include apparatus and methods described in a commonly assigned copending application, Ser. No. 08/062,057, entitled "Branch Target Buffer with Per-Set Pattern Table", by Bradley D. Hoyt et al., filed Jul. 15, 1993 and Ser. No. 08/062,012, entitled "Speculative History Mechanism in a Branch Target Buffer", by Bradley D. Hoyt et al., filed Jul. 15, 1993. The IFU 112 includes any conventional circuitry and control logic that retrieves data from memory 104 or the cache 106 via section 100. As defined herein, "information" includes instructions and other stored data.

A decoder section 120 includes a branch control unit 122 coupled to the instruction fetch section 110. The branch control unit 122 includes fast detection logic to quickly analyze the opcodes of the macroinstruction, and to output a branch valid signal indicative of whether or not the macroinstruction is a branch. The branch control unit 122 also includes circuitry, responsive to the branch valid signal and the branch macroinstruction, to calculate an actual target address and a fall-through address in the event that the branch is not taken. As implemented, each of those addresses have a width of thirty-two bits.

An instruction decoder 124, which is described in further detail herein is coupled to the branch control unit 122 and the instruction fetch section 110, to receive macroinstructions therefrom and decode them into a series of micro-operations. A microcode ROM and microcode sequencer 126 are coupled to the instruction decoder 124 to receive an entry point, and in response, supply multiple micro-operations for long flows and also to supply appropriate control signals.

A register renaming section 130 is coupled to receive instructions from the instruction decoder 124. The register renaming section may include circuitry such as a register allocation table ("RAT"), and an allocator circuit. A function of the register renaming section 130 is to rename the registers specified by the instructions. Options for a register renaming section are discussed for example, in Chapter 6 of "Superscalar Microprocessor Design" by Mike Johnson, Prentice-Hall, Inc., Englewood Cliffs, N.J., 1991, and can be implemented therefrom.

An out-of-order execution section 150 includes a reservation station 160 that is coupled to the register renaming section 130 to receive micro-operations therefrom, and a re-order buffer ("ROB") 170 that is also coupled to the register renaming section 130 to receive micro-operations therefrom. The execution units 180 include a plurality of execution units 180, such as an address generation unit ("AGU"), an integer execution unit ("IEU"), a floating point execution unit ("FEU"), and a memory interface unit ("MIU"). The execution units 180 are coupled to the memory control section 102, the reservation station 160, and the re-order buffer 170.

Retirement logic 190 is coupled to the ROB 170. A retirement register file ("RRF") is coupled to the retirement logic 190 and the ROB 170. When the retirement logic 190 determines that an instruction that has an entry in the ROB 170 has completed execution and is ready to retire, it stores the information into the retirement register file (RRF) 192. More details of a register renaming section 130, ROB 170, retirement logic 190, RRF 192, and related circuitry can be found in an application entitled, "Speculative and Committed Resource Files in an Out-of-Order Processor", Ser. No. 08/177,244, filed Jan. 4, 1994, which is incorporated by reference herein.

Discussion of Micro-operations

The decoding system described herein receives a plurality of macroinstructions that are supplied to a plurality of decoders for decoding. Each decoder includes an aliasing system, in which the opcodes of the macroinstruction are decoded into micro-operations, termed herein "uops" and fields from the macroinstruction are extracted and stored in alias registers. The aliasing system provides a mechanism by which fields extracted from the macroinstruction can be indirectly referenced and incorporated into the micro-operations. An exemplary aliasing system is described in U.S. Pat. No. 5,222,244 issued to Carbine et al., on Jun. 26, 1993. Each macroinstruction can be decoded into a sequence of one or more uops.

During the decoding process, a macroinstruction is initially decoded into a control micro-operation, termed a "Cuop" herein, that includes selected fields and aliasing information used to indirectly access macro-alias data. The Cuop is then built up via intermediate forms to a final form that is issued into subsequent units. Particularly, the Cuop is then combined with alias fields to provide an "Auop", which is a micro-operation in which aliasing has been resolved. Finally, the Auop is combined with other fields, such as an immediate field, to provide a decoder-issued Duop, termed "Duop" herein that is issued to subsequent units.

Discussion of decoding herein is limited to aspects pertinent to the handling and processing immediate data. Detailed information regarding the uops and others aspects is discussed in the patents cross-referenced at the beginning of this application.

Discussion of Selection and Interpretation of Cuop Immediate Field

Reference is now made to FIG. 3, which is a block diagram of circuitry that pertains to the handling immediate data within one of multiple decoders. The block diagram of FIG. 3 depicts one implementation of circuitry for processing the immediate field. In another preferred embodiment described elsewhere, circuit optimizations have been utilized to take advantage of time- or space-saving opportunities within the implemented pipeline structure. Therefore, it should be borne in mind that FIG. 3 is an exemplary embodiment.

As illustrated in FIG. 3, a fetching and steering unit 300 provides a macroinstruction simultaneously to: 1) a branch detection logic 303 that is coupled to a branch address calculator 304, 2) an entry point PLA 305 that is coupled to a microcode sequencing (MS) unit 306, 3) an XLAT PLA 310, and 4) field extractors 312. "PLA" is an acronym for "Programmable Logic Array", which a programmable circuit commonly used for decoders. XLAT PLA refers to "translate PLA". As is well known in the art, PLAs can also be implemented in the form of combinational logic, either static or dynamic. In one preferred embodiment, the XLAT PLA 310 is implemented in static combinational logic. For purposes of practicing the decoder described herein, it is not necessary that these logic elements be programmable.

The branch address calculator ("BAC") 304 includes circuitry, responsive to a branch macroinstruction, to calculate a branch target address and a branch fall-through address that is useful if the branch is mispredicted. Branch detection logic 303 is included to detect all branch macroinstructions and signal the BAC 304 to begin address calculations.

The macroinstruction is also supplied to the entry point PLA 305 that is coupled to the MS unit 306 which provides micro-operations for long flows. Particularly, the opcodes within the macroinstruction provide an entry point via the PLA 305 into the MS unit 306, which may then issue microcode Cuops appropriate for long flows. In some instances, microcode within the MS unit 306 includes a microcode branch instruction. In such an instance, the target and fall-through addresses of the micro-branch are calculated within the MS unit 306 and supplied as micro-branch immediate data.

The XLAT PLA 310, and the MS unit 306 supply Cuops into a Cuop register 320. In the preferred embodiment, as described in detail elsewhere and in the applications cross-referenced herein, a plurality of XLAT PLAs are provided, each of which provides a Cuop into its own associated Cuop register. For purposes of this description with reference to FIG. 3, only a single XLAT PLA 310, and a single Cuop register are illustrated.

The macroinstruction is also coupled to field extractors 312, which extract macro-alias data therefrom which is stored in macro-alias registers 314. The macro-alias data within the macro-alias registers includes an immediate field 316 and the displacement field 318, which in the preferred embodiment includes thirty-two bits. This data may include, for example, the 32-bit immediate or the 32-bit displacement field of an INTEL i486™ macroinstruction.

The Cuop within the Cuop register 320 includes a plurality of fields. Included within these fields is a Cuop immediate field 324 and a Cuop alias control field 326. The Cuop immediate field 326 is coupled to a literal sign extension unit 330 that, responsive to the Cuop immediate field 324, translates the Cuop immediate field 324 into literal immediate data. The literal sign extension unit 330 includes conventional circuitry to perform conventional sign extension. Alternatively, the literal sign extension unit 330 could include a circuitry to zero extend the literal to a size corresponding to the data path into which it will be inserted. For example, an 8-bit literal can be extended to sixteen bits by concatenating eight "zero" bits as the most significant digits.

The Cuop immediate field 324 is applied from the Cuop register 320 to an integer constant ROM 340, which applies it as an address into the integer constant ROM 340 to supply indirectly-accessed constant immediate data.

The Cuop alias control field 326 and the Cuop immediate field 324 are supplied from the Cuop register 350 to an alias field decoder 350. Within the alias field decoder 350, the Cuop alias control field 326 and the Cuop immediate field 324 are decoded to indicate the eventual source of the Duop immediate field 326 to be issued, and to provide the control signals to accomplish issuance of that Duop immediate field. Particularly, the alias field decoder 350 examines the Cuop alias control field 326 and the Cuop immediate field 324 to select one source of immediate data, which will then be selected and supplied as a Duop immediate field. Sources for immediate data include the macro-branch immediate data, the micro-branch immediate data, the sign extended literal immediate data from the Cuop, the directly-accessed constant immediate data, and the MAR immediate data (i.e., immediate data from the macro-alias registers).

The alias field decoder 350 is coupled to alias multiplexers 380, to supply a signal to select and interpret information in the macro-alias registers, as determined within the alias field decoder 350.

The macro-alias registers 314 are also coupled to alias multiplexers 380. The alias multiplexers 380 also receive data from the Cuop within the Cuop register 320. Within the alias multiplexers 380, the macro-alias data and the Cuop fields are combined to output an Auop into a main queue 384.

The main queue 384, described in further detail elsewhere, includes circuitry to buffer the Auops until they can be eventually issued from the decoder.

A 5:1 multiplexer 390 is coupled to receive inputs including the macro-branch immediate data, the micro-branch immediate data, literal immediate data, indirectly-accessed constant immediate data, and data from one of the macro-alias registers 314. The macro-branch immediate data may include an actual target address and a fall-through address. Similarly, the micro-branch immediate data may include the actual target address and a fall-through address. Responsive to control from the alias field decoder 350, the multiplexer 390 selects one of these inputs and then supplies a Duop immediate field 396, which is combined with the Duop fields issued from the main queue 384 to supply a complete Duop issued from the decoder.

As discussed earlier, the above description with reference to FIG. 3 describes exemplary circuitry to accomplish and implement one embodiment. In the preferred and other embodiments, the actual implementation includes modifications in order to optimize circuit design, as will be further discussed.

Reference is now made to FIG. 4, which is a flow chart illustrating operations to decode a macroinstruction to supply a Duop immediate field which is then combined with the additional fields to form a complete Duop that can then be issued from the decoder.

Operations to fetch and steer a particular macroinstruction begin in a box 400. Operations then move to a box 404 in which the Cuop is provided. The Cuop includes the Cuop immediate field 324 having nine bits in the preferred embodiment and a Cuop alias control field 326 having five bits. In parallel, operations move to a box 408 that extracts fields from the macroinstruction to supply a macro-alias data which is then stored in the macro-alias register 314 in a box 410.

Subsequent to providing the Cuop in the above box, operation moves to a box 420 decode the Cuop alias control field 326. Dependent upon the decoding results, one of several outcomes is possible. These outcomes can be generally classified into two groups; 1) a first group illustrated in decisions 430, 432, 434 that selects the Cuop immediate field 324, and then interprets utilization of the Cuop immediate field 324, and 2) a second group illustrated at 440, 442 that selects immediate data from external sources, such as a macro-branch data or micro-branch data.

In the first group, if, as illustrated in the box 430, decoding of the Cuop alias control field 326 indicates that the Cuop immediate field 324 is interpreted directly as a literal, then operation moves to the box 450 in which that operation is performed, and the 9-bit literal is processed to provide a sign extended 32-bit immediate data.

However, as illustrated in the box 432, if decoding indicates that the Cuop immediate field 324 addresses an integer constant ROM, then the 9-bit Cuop immediate field 324 is applied into integer constant ROM 340 as illustrated in a box 452 to provide constant 32-bit immediate data.

However, as illustrated in a box 434, if the Cuop immediate field 324 is determined to be a reference to a macro-alias register 314, then as illustrated in a box 454 the 9-bit Cuop immediate field 324 is applied to select one of the macro-alias registers 314, which is interpreted and processed as illustrated in the box 456 to provide MAR immediate data. The selected macro-alias register 314 could include the immediate field 316, or the displacement field 318.

If the decoding operations within the box 420 indicate that the immediate field is to be supplied from an external source instead of the 9-bit Cuop immediate field 324, then operations are performed to obtain that data. Particularly, as illustrated at box 440, if the Duop immediate field 396 is to include micro-branch information, then as illustrated in a box 460 that micro-branch immediate data is obtained from the MS unit 306. If, however, as illustrated at 442, the issued Duop immediate field includes macro-branch information, then the macro-branch immediate data is obtained from the BAC 304 as illustrated in a box 462. The macro-branch address, and the micro-branch address could include either a target address, or a fall-through address. Therefore, those boxes 460, 462 may obtain either or both of those types of 32-bit immediate data.

The immediate fields from the boxes 450, 452, 460, 462, and 454 are applied to a box 470 which indicates that the Duop immediate field 396 is ready for issue. Particularly, in the illustrated logic flow, only one path for the immediate data will be accurate. In an actual implementation however, some or all of the immediate data can be supplied in parallel. Subsequently the one correct source of data, as determined by the above-described decoding operations, is selected.

Subsequently, after the Duop immediate field 396 is ready for issue from the box 470, it is combined with additional fields to form a complete Duop that is then available for issue from the decoder to subsequent units.

The Immediate Data Bypass and Shadow Queue

Reference is made to FIG. 5, which is a diagram of operations occurring during three pipeline stages in one preferred implementation. FIG. 5 illustrates the way in which immediate data bypasses the micro-operation processing path. One advantage of this configuration is provision of extra time to process certain immediate data, without slowing processing of micro-operations in other paths.

The timing diagram of FIG. 5 includes two sections: 1) a first section that illustrates a processing of all micro-operation fields except the immediate field, and 2) a second section that addresses the immediate field. The first section, which addresses all fields except the immediate field, includes all cases. The second section divides immediate field processing into three cases: Case A—processing of the Cuop immediate field, Case B—processing a micro-branch information, and Case C—processing of macro-branch information.

The timing diagram of FIG. 5 is divided up into three stages that occur in successive clock cycles: a ID1 stage 500, a ID2 stage 502, and a RAT stage 504. The ID1 stage 500 and the ID2 stage 502 represent the first and second stages in the instruction decoder. The third clock stage 504 is designated "RAT" because operations are occurring within the register allocation table (RAT) within the register renaming section 130.

In a first substage 510 of the ID1 stage 500, a macroinstruction is steered to the decoder. In the next substage 512 of ID1, a Cuop is generated in an XLAT PLA, and fields are extracted in a field extractor and inserted into macro-alias registers.

In a first substage 514 of the ID2 stage 502, an Auop is assembled in alias multiplexers 380 from Cuops and macro-alias data. In a second substage 516, the Auops are supplied to a FIFO queue and then dispatched to the RAT. Next, in a first substage 520 of the RAT stage 504 the registers are renamed. In the second substage 522, the complete Duop (except immediate fields) is then supplied from the RAT.

Although in the preferred implementation the Duop is processed within the RAT, for purposes of the following description the Duop will be treated as if it went through the RAT unchanged. In the event of stalls, uops will remain in the queue until the RAT is ready to accept them.

As discussed above, the second section which illustrates processing of the immediate field is divided into several cases. In Case A, the Cuop immediate field is utilized to create the immediate data for the final Duop. In a first substage 530 of the first decoder stage 500, the macroinstruction is steered to the decoder. In a second substage 532, the Cuop alias control field 326 is generated within the XLAT PLA 310. Also, the Cuop immediate field 324 is generated. Furthermore, as described above, the fields are extracted from the macroinstruction and inserted into macro-alias registers.

In the second decoder stage ID2, and a first substage 534, the Cuop alias control field 326 is decoded. In a second substage 536, the data is selected in response to the decoded information. Selection is made from either the macro-alias register or literally from the Cuop. In a third substage 538, the selected data, termed "AIMM" data, is written into the main queue.

Next, in a first substage 540, of the RAT stage 504, the AIMM data is read from the main queue and written into a shadow queue which is a FIFO queue that "shadows" the main queue. Subsequently, in a second substage 542, the AIMM data is supplied from the shadow queue to constant ROM.

Finally, in a third substage 544, selection is made between constant ROM output and AIMM data to issue the Duop immediate field to the ROB. The selection in this third substage 544 is controlled responsive to decoding the Cuop alias control field and the Cuop immediate field in the first substage 534 of the second decoder stage 502.

In Case B, the immediate data is a micro-branch address. In a first substage 550 of the first decoder stage 500, operations are performed to address the microcode ROM. Particularly, the MS unit has been invoked to produce a sequence of micro-operations, as discussed elsewhere. For example, a macroinstruction has been supplied to the entry point PLA 305, which responsive thereto generates an address to the microcode ROM within the MS unit 306, which then sequences uops starting from the supplied address. The micro-branch Cuop discussed here is generated by one of those microcode operations. In a second substage 552, the micro-branch Cuop is generated in the MS unit 306.

In the second decoder stage 554, the micro-branch address data is generated within the MS unit 306.

Next, in a first substage 556 of the RAT stage 504, the micro-branch immediate data generated previously is supplied to the shadow queue. In a second substage 558, the immediate data is then issued to the ROB.

Case C addresses processing of a macro-branch. In a first substage 570 of the first decoder stage 500, the macroinstruction is steered to branch detection logic. In a second substage 572, the macro-branch is detected. Throughout the second stage 574, the branch address is generated in the BAC 304.

Next, in a first substage 576 of the RAT stage, macro-branch immediate data is supplied to the shadow queue. Finally, in a second substage 578, the immediate data is issued to the ROB.

The shadow queue and the main queue are both FIFO queues that follow the same control sequence, except that the shadow queue is one stage behind that of the main queue. Therefore, those instructions that are issued from the main queue, their associated immediate data will be issued in the same slot except one cycle later. That data can then be matched up with data that has passed through the RAT. Because the immediate data is not required by the RAT, the Duop immediate field can be matched up with its respected micro-operation later with no loss of performance. If a stall occurs, then both queues are halted. As a result, the immediate data is always synchronized with its associated uop fields at the output of the RAT.

Reference is now made to FIG. 6 which is a diagram illustrating the circuit connections in one preferred implementation of the immediate data bypass circuitry and shadow queue.

The fetch and steering unit 300, as discussed previously, supply a macroinstruction to the branch detection logic 303 that is coupled to the BAC 304. The macroinstruction is also supplied to the entry point PLA that is coupled to the MS unit 305, and to decoders illustrated generally at 600.

Particularly, the decoders 600 include a multipath decoder that includes a D11 decoder 602, a D12 decoder 604, a D13 decoder 606, and a D14 decoder 608. Each of these decoders 602–608 receives the same macroinstruction. However, each decoder supplies a different output. Particularly, the D11 decoder 602 issues a first Auop, the D12 decoder 604 issues a second Auop, the D13 decoder 606 issues a third Auop, and the D14 decoder 608 issues a fourth Auop. Production of Auops is discussed in more detail in the related applications cross-referenced at the beginning of this application.

Dependent upon the micro-operation being decoded, the decoders 602–608 issue one, two, three, four, or, in some instances, zero micro-operations. The first micro-operation in the sequence may actually be issued, not from the D11 decoder 602, but from subsequent decoders, in which case the previous decoders either provide no Cuop, or the Cuop issued therefrom is marked invalid. The decoders 602–608 share the same field extractor. Furthermore, those decoders 602–608 are coupled to the MS unit 306.

In addition to the multiple micro-operation decoder 600, a D2 decoder 620 is coupled to receive a second macroinstruction, and a D3 decoder 622 is coupled to receive a third macroinstruction. This decoder configuration is discussed in detail in the cross-referenced applications.

For purposes of the present description, multiple Auops are provided from the decoders 600, 620, and 622 into a main queue 630. Control for the main queue 630 is illustrated in a box 632. Further description of the control circuitry within this box 632 is presented with reference to subsequent figures.

Reference is now made to FIG. 7, which illustrates circuitry within each of the decoders 602–608, and the second decoder 620 and the third decoder 622.

The macroinstruction is supplied to an XLAT PLA 700, which in response thereto provides a 9-bit immediate field 706, and a 5-bit immediate alias control field 706. The XLAT PLA 700 is coupled to supply the immediate alias control field 704 and the 9-bit Cuop immediate field 706 to the MUX control unit 710. The XLAT PLA 700 is also coupled to an alias multiplexer 720, to supply the 9-bit Cuop immediate field 706 thereto.

The macroinstruction is also coupled to the field extractor 312, which, as discussed previously, extracts fields from said macroinstruction and stores them in the macro-alias registers (MARs) 314. Particularly, the extracted data includes 32-bit MAR immediate fields 316, and a 32-bit displacement field 318. Each of these fields 318 are supplied to the alias multiplexer 720.

The MUX control unit 710 operates as follows. If the Cuop immediate field is aliased, then the Cuop immediate field will be decoded to determine which immediate data will be supplied. If a first alias bit is asserted, then the MUX control unit 710 controls the alias multiplexer 720 to specify which of the fields 316, 318 will be supplied through the alias multiplexer to supply the AIMM field 730. However, if the first alias bit is not asserted, then the 9-bit Cuop 324 applied to the MUX is processed within the MUX control unit 710 to provide a 32-bit output which is then applied through the alias multiplexer as the AIMM field 730.

Within the alias multiplexer 720, if the first alias bit is asserted, the 9-bit Cuop immediate field can also specify a macro- or micro-branch target or fall-through address, or whether the 32-bit integer constant ROM will be utilized later, as will be described.

From the decoders 600, 620, and 622, a plurality of Auops, and associated AIMM field is supplied. Furthermore, each of the decoders 602, 604, 606, 608, 620, and 622 output a control signal that is supplied to the multiplexer that selects one of the sources for immediate data. Specifically, the D11 decoder 602 issues an S11 control signal, the D12 decoder 504 issues an S12 control signal, the D13 decoder 606 issues an S13 control signal, the D14 decoder 608 issues an S14 control signal, the D2 decoder 620 issues an S2 control signal, and then the D3 decoder 622 issues an S3 control signal.

Within the main queue 630, the Auop and the immediate field are input. The first three of Auops that are valid are issued from the main queue 630 into the register renaming circuit 130. However, the full six AIMM data are supplied to a plurality of multiplexers. Particularly, a first AIMM line 640a is supplied to a first multiplexer 650a, a second AIMM line 640b is supplied to a second multiplexer 650b, a third AIMM line 640c is supplied to a third multiplexer 650c, a fourth multiplexer line 640d is supplied to a fourth multiplexer 650d, a fifth AIMM line 640e is supplied to a fifth multiplexer 650e, and a sixth AIMM line 640f is supplied to a sixth multiplexer 650F.

Each multiplexer 650a–f is also coupled to receive an input from the BAC 304. The input from the BAC 304 can be an actual target address, a fall-through address, or both. In the later instance, two 32-bit inputs may be required into the multiplexers 660a–f.

Another input into the multiplexers 650a–f include immediate data from the MS unit 306, which, like macro-branch address, can include an actual target address and a fall-through address.

The multiplexers each receive a control input from one of the decoders. Particularly, the first multiplexer 650a receives the S11 control signal, the second multiplexer 650b receives the S12 control signal, the third multiplexer 650c receives the S13 control signal, the fourth multiplexer 650d receives the S14 control signal, the fifth multiplexer 650e receives the S2 control signal, and the sixth multiplexer 650f receives the S3 control signal.

The multiplexers 650a–f are each coupled to a shadow queue 660, which includes a plurality of slots for receiving immediate data from each of the six multiplexers 650a–f. The shadow queue 660 is coupled to the same control mechanism 632 as the main queue 630, however, as illustrated by the delay element 662, which introduces a one clock delay, the shadow queue 660 is one stage (i.e., one clock cycle) behind. Therefore, the shadow queue 660, responsive to the six inputs, issues three outputs that are identical with the three outputs from the main queue 630 one cycle later. Specifically, the shadow queue outputs a first SIMM on a line 664a, a second SIMM line 664b, and a third SIMM line 664c. The lines 664a–c are utilized either to directly provide an output, or as an address into integer constant ROMs. Specifically, the first line 664a is coupled to an integer ROM 670a and to a first 2:1 MUX 674a. The output of the integer ROM 670a is also coupled to multiplexer 674a. The multiplexer 570a receives a control signal C1 decoded from the Cuop alias bits which indicates which of the inputs to be utilized to supply the first Duop immediate field. Similarly, the second SIMM line 664b is coupled to a second integer ROM 670b and to a second multiplexer 674b. A second input to the multiplexer 674b is the coupled to the integer ROM 670b. The third SIMM line 664c is applied similarly to a integer ROM 670c and a multiplexer 674c.

One advantage of the above configuration is minimization of space. Particularly, the integer ROMs 670a–c, which are utilized when the Cuop immediate field 324 is interpreted to be an address, could be positioned before the shadow queue 660. However, in that instance six integer ROMs would be required. The present configuration takes advantage of the fact that only three immediate data outputs are required and therefore waits until those immediate outputs have been provided to apply the address into the constant ROM 670a–c. This configuration adds control complexity, but the benefit is reduced cost.

The first Duop immediate field is then coupled to the first uop fields from the register renaming circuit 130, and likewise, the second Duop immediate field is combined with the second uops from the register renaming circuit 130, and the third immediate field is associated with the third uop field from the register renaming circuit 130. Thus, a complete Duop is supplied to the ROB and subsequent units.

Packing, Aligning, and Queuing Micro-operations

Reference is now made to FIG. 8, which is a diagram of one embodiment of a system for packing, aligning, and queuing micro-operations received from a decoder.

The illustration, in FIG. 8, is intended for illustrative purposes only. For example, FIG. 8 illustrates four micro-operations supplied in parallel. However, in the preferred embodiment, six micro-operations are supplied. It will be apparent that the principles described herein are applicable to any number of output micro-operations greater than two and that an extension from the illustrated four to six or any other number is straightforward.

A plurality of uops 801, 802, 803, and 804 are supplied in parallel. Each of these uops may or may not be valid, and therefore a valid bit is associated with each. Particularly, a first valid bit 811 is associated with a first uop 801, a second valid bit 812 is associated with a second uop 802, a third valid bit 813 is associated with a third uop 803, and a fourth valid bit 814 is associated with a fourth uop 804.

A plurality of packing multiplexers 821–824 are coupled to receive the four uops 801–804. Particularly, a first packing multiplexer 821 is coupled to each of the four uops, and responsive thereto, provides a first packing MUX output. Similarly, a second packing multiplexer 822, a third packing multiplexer 823, and a fourth packing multiplexer 824 receive each of the four uops 801–804 and provide a packing multiplexer output.

A plurality of aligning multiplexers 831–834 are coupled to receive the outputs from the plurality of packing multiplexers 821–824. Particularly, a first aligning multiplexer 831 is coupled to receive the first, second, third, and fourth packing multiplexer outputs, and responsive thereto to select one of said outputs. Similarly, a second aligning multiplexer 832, a third aligning multiplexer 833, and a fourth aligning multiplexer 834 are coupled to each of said packing multiplexers 821–824.

A circular queue 850 is provided that has a plurality of entries. As illustrated, the circular queue has four entries, each coupled to one of the outputs of the aligning multiplexers. Particularly, a first entry 851 is coupled to the first aligning multiplexer 831, the second entry 852 is coupled to the second aligning multiplexer 832, a third entry 853 is coupled to a third aligning multiplexer 833, and a fourth entry 854 is coupled to a fourth aligning multiplexer 834. As conventional, the circular queue 850 includes control circuitry that has pointers, including a first-byte-to-be-issued pointer, and a next-available-location pointer. These two pointers, and their uses will be described in more detail subsequently.

The circular queue 850 in the preferred embodiment is constructed of transparent latches, which means that data can be read out from the queue in the same cycle as it is written into the queue. Use of transparent latches for the entries advantageously saves time when the queue is empty, such as restart following branch misprediction. In that instance, the new uops can flow directly through the queue without delay.

A plurality of issue multiplexers are coupled to the entries in the circular queue in order to issue micro-operations therefrom, as requested by subsequent units. As illustrated, the number of issue multiplexers is three. However, in other embodiments, there could be fewer issue multiplexers, or additional multiplexers, although it would not be useful to include more issue multiplexers than the number of entries in the queue. Each issue multiplexer is coupled to each of the entries in the circular queue. Particularly, a first issue multiplexer 871 is coupled to the first, second, third, and fourth entries in the circular queue. Similarly, a second issue multiplexer 872 is coupled to all entries, and a third issue multiplexer 873 is coupled to all entries in the circular queue. Control for the issue multiplexers 871–873 is discussed subsequently with reference to FIG. 9, for example.

Reference is now made to the flow chart of FIG. 9, which illustrates operations within the embodiment of FIG. 8 for packing, aligning, and queuing micro-operations. In a first box 900, the valid bits are examined to create the packing MUX controls. Particularly, the state of each of the valid bits is ascertained, and the control is created in such a way that all valid micro-operations are positioned, in order, in adjacent outputs of the packing multiplexers 821–824. For example, if the second and fourth uops are valid, but the first, second and third are not, then the output of the first packing multiplexer 821 will be the second uop, and the output of the second packing multiplexer 822 will be the fourth uop. The outputs of the remaining two packing multiplexers 823 and 824 are not used, so they may simply pass through the value of the uop immediately above it, although it should be remembered that this uop will be marked invalid. For example, the third packing multiplexer 823 may pass through the value of the third micro-operation 803, although it is invalid.

In accordance with this packing control, the micro-operations are packed as illustrated in the box 904 to "side justify all valid micro-operations". Furthermore, the valid bits themselves are packed so that the each valid bit is associated with its respective packed uops.

Subsequently, as illustrated in box 908, the first-available-location pointer is examined to create controls for the alignment multiplexers 831–834. Particularly, the next-available-location pointer is examined, and control for the alignment MUXes 831–834 is developed in a conventional manner so that the first valid Cuop is inserted in the first available location, the second valid micro-operation is inserted in the second available location, and so forth. Subsequently, operation proceeds to a box 910 in which the packed micro-operations are aligned in the aligning multiplexers 831–834, and the packed valid bits are also aligned in response to the first available location pointer. The next operation proceeds to a decision in the box 914. If the queue does have sufficient space for only new Auops, then operations proceed, however if there is not sufficient space, then operation returns to the alignment step in the box 910 which continues until sufficient entries are available within the queue.

Once enough entries are available, then operation moves from the box 910 to the box 920 in which the aligned and packed valid bits are used as enables to latch the packed and aligned micro-operations into the entries in the queue. Subsequently, operation moves to the box 924 in which the first-to-issue pointer is examined to create control for the issue multiplexers. Finally as illustrated in the box 928, and when requested by subsequent units, the next micro-operations are issued starting at the first-to-issue pointer through the issue MUXes to the next processing unit, which is the RAT.

Reference is now made to FIG. 10 which is an example of operations to pack, align, and issue several micro-operations. Beginning at the top, the queue contents are initially assumed to be invalid, except for the second entry, which is designated "Z", the remainder are designated BLANK. Therefore, the first-to-issue pointer points to the second entry, and the next available pointer points to the third entry. The valid bits illustrate that all instructions are valid except for the second uop (uop B). Therefore, the packing MUX control is chosen so that the first packing multiplexer selects the first micro-operation (uop A), the second packing multiplexer skips uop B and selects the uop C, and the third packing multiplexer selects uop D. The fourth packing multiplexer selects, arbitrarily, uop D. The valid bits are packed similarly to provide packed valid bits.

Next, the packed uops and the packed valid bits are applied to the aligning multiplexers. The aligning MUX control is based on the first-available-location pointer which, in this example, is the second entry. The result is that each of the packed uops is rotated two places to the right, so that they can be inserted directly into the circular queue. Similarly, the valid bits are rotated two places to the right to provide aligned valid bits.

If sufficient entries are available in the queue to receive all valid uops, the aligned valid bits are utilized to latch the aligned uops into the queue. In this embodiment, if insufficient slots are available to receive all uops, then operation waits until sufficient entries have become available. Other embodiments could utilize other types of control schemes.

Next, issue multiplexer control is developed, in accordance to the first-to-issue pointer which, in this example, points to the second entry. Therefore, the first three entries beginning with the second entry are multiplexed out from the circular queue via the issue multiplexers.

Subsequently, the queue state is changed so that the only valid entry is D in the first entry. Furthermore, the pointers are changed so that the first entry is the first-to-issue pointer and the second entry is the next-available-location pointer.

Reference is now made to FIG. 11, which is a diagram of the control configuration useful for the two-level embodiment described with reference to FIGS. 8–10. Particularly, a packing control signal, designated control A is applied to the packing multiplexers. Because there are four possible outputs, and because there is no predefined sequence of valid or invalid uops, the number of control lines to each multiplexer must be equal to the number of uops supplied to the multiplexers, which in this case equals four. Each packing multiplexer receives a control signal, so there are four times four (4×4) control lines in this example.

The control unit also produces an aligning control signal, designated as control "B", which controls each of the alignment MUXes. Because the purpose of the aligning MUXes is to rotate the packed uops to the next-available-location pointer, each of the control lines can be coupled to the next lowest control line in the next multiplexer. For example, if the first aligning multiplexer selects the second packing multiplexer, then the second aligning multiplexer selects the third packing multiplexer, and so forth. Therefore, only four control lines are required to implement the control B signal, and each of the multiplexers is coupled to the adjacent multiplexer, in order to properly rotate the packed uops.

Reference is now made to FIG. 12 which is an illustration of the preferred embodiment in which the packing multiplexers 821–824 and the aligning multiplexers 831–834 have been combined to a single level of multiplexers, designated as the packing and aligning multiplexers. Particularly, each of the four uops 801–804 is coupled to a packing and aligning multiplexer 1201–1204. For example, a first packing and aligning multiplexer 1201 is coupled to receive the first uop 801, the second uop 802, the third uop 803, and the fourth uop 804. Similarly, the second packing and aligning multiplexer 1202 is coupled to receive each of the uops 801–804. The third multiplexer 1203 and the fourth multiplexer 1204 are coupled similarly. The output of each packing and aligning multiplexer 1201–1204 is coupled directly to the circular queue. Particularly, the first packing and aligning multiplexer 1201 is coupled to supply its output to the first entry 851 in the circular queue, the second packing and aligning multiplexer 1202 is coupled to supply its output to the second entry 852 of the circular queue, and similarly, the third and fourth packing and aligning multiplexers 1203 and 1204 are coupled to supply their outputs, respectively, to the third and fourth entries 853 and 854.

Reference is now made to FIG. 13, which is a flowchart which illustrates operation of the preferred embodiment of FIG. 12 in which the packing and aligning multiplexers are combined in one level. In a first operation in a box 1300, the micro-operation valid bits are examined to create a packing control signal (signal A), which, similarly to the packing control signal discussed previously, examines each valid bit, and places all valid uops, in order, in adjacent multiplexers.

In the next operation in a box 1304, the first-available-location pointer is examined to create a control signal to the alias packing controls. Particularly, the control signals are designed to rotate each signal by the amount designated by the first-available-location pointer.

In the next operation in a box 1308, the aligning control signal is applied to rotate the packing control signals to supply aligned packing controls. As will be described, multiplexers are utilized in this operation.

In the next operation in a box 1310, the aligned packing controls are utilized to control the packing and aligning multiplexers to align the micro-operations to the next available queue locations. Furthermore, the aligned packing controls are also utilized to steer the valid bits to be used as later controls.

Next, a decision is made in a box 1320 as to whether the queue has sufficient space for all of the new micro-operations. If not, operation waits until sufficient space is available.

After sufficient space is available in the queue, then operation moves to the box 1330 in which the new micro-operations are latched into the queue using the valid bits to determine the micro-operations latched into the queue.

Reference is now made to FIG. 14 which is a diagram illustrating the application of the control signals to the one-level preferred embodiment illustrated in FIGS. 12 and 13.

In FIG. 14, the packing control signals designated control A are supplied in such a manner as to pack the micro-operations as has been previously described. The control signals are applied, respectively, as an input to rotator control multiplexers 1401–1404. The rotator control multiplexers are controlled by the aligning control signal designated control "B", which, as described aboves operates to rotate the inputs. In this instance, rather than actually rotating the data, it is the control signals themselves that are rotated by the control signal in the rotator control multiplexers 1401–1404. The output of the rotator control multiplexers, designated control "C", is applied to each of the packing and aligning multiplexers 1201–1204 to select the output that is applied directly to the entry in the circular queue as a packed and aligned micro-operation.

Reference is now made to FIG. 15, which is an example of operations in accordance with the embodiment illustrated in FIGS. 12–14. Particularly, FIG. 14 is an example of operations to pack micro-operations in accordance with the embodiment illustrated in FIGS. 12 through 14, utilizing the same beginning state as in the example of FIG. 10. However, instead of the packing MUX control signal, the packing control signal A is developed as described above, but it is not applied to the packing muxes. Instead, the packing control signal A is applied directly to the control multiplexers. The aligning signal is applied to the rotator control multiplexers, which output the control "C" signal, which is directly applied to pack and align the uops and supply them to the circular queue.

From the above description, it will be apparent that the invention disclosed herein provides a novel and advantageous split queue system. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. The following claims are indicative of the scope of the invention. All variations which come within the meaning and range of equivalency of the claims are to be embraced within their scope.

What is claimed is:

1. A split queue system for a decoder the split queue system being configured to decode an instruction's micro-operations separate from each micro-operation's associated data, the split queue system comprising:

a main queue coupled to receive a micro-operation from a decoder;

a next processing stage coupled to receive the micro-operation issued from the main queue and to process the micro-operation in one cycle to provide a processed micro-operation;

a shadow queue coupled to receive the micro-operation's associated data from the decoder; and a control circuit coupled to the main queue and the shadow queue for issuing the micro-operation from the main queue in a first cycle and issuing data associated with the micro-operation in a second cycle so that the data is synchronized with its associated processed micro-operation.

2. The split queue system of claim 1 further comprising:

a branch address calculator configured to calculate branch addresses associated with associated data and coupled to the shadow queue to provide the micro-operation's associated data.

3. The split queue system of claim 1 further comprising:

a control field associated with the associated data;

a constant ROM coupled to the output of the shadow queue and configured to receive the associated data and provide a constant output responsive thereto; and a selector configured to select one of the constant outputs and the data which selector output is synchronized with its associated processed micro-operation in response to the control field.

4. A split queue system according to claim 3, wherein the shadow queue includes a plurality of inputs and a plurality of outputs and has a larger number of inputs than outputs and wherein each output is coupled to a constant ROM to receive associated data and to provide an output in response thereto.

5. A method according to claim 4 wherein the instruction received in the decoder is received from a series of variable length instructions.

6. In a split queue system for a decoder having a main queue coupled to the decoder, a next processing stage coupled to the main queue, a shadow queue coupled to the decoder, a control circuit coupled to the main queue and the shadow queue, a branch address calculator coupled to the shadow queue, a constant ROM coupled to the output of the shadow queue and a selector, a method of decoding instructions comprising:

(a) receiving instruction in the decoder;

(b) transmitting a micro-operation from the instruction to the main queue;

(c) transmitting data associated with the micro-operation to the shadow queue;

(d) outputting a processed micro-operation from the main queue in a first clock cycle; and (e) outputting data associated with the micro-operation from the shadow queue in a second clock cycle.

7. A method according to claim 6 further comprising:

(b)(1) receiving the micro-operation into the next processing stage from the main queue after step (b);

(b)(2) processing the micro-operation in one cycle in the next processing stage; and (c)(1) processing the data associated with the micro-operation after step (c);

wherein the sequence of steps (d) and (e) outputting the data associated with the micro-operation occurs one clock cycle after outputting the processed micro-operation allows one extra clock cycle for processing the associated data.

8. A method according to claim 7 wherein the micro-operation is processed in one cycle, wherein the data associated with the micro-operation pertains to branch address calculations and wherein the data is processed during the extra clock provided by the sequence of steps (d) and (e) with the branch address calculator.

9. A method according to claim 7 wherein the micro-operations are issued from the main queue in a first cycle and the data associated with the micro-operation is issued by the shadow queue in a second cycle so that the data is synchronized with its associated processed micro-operation.

10. A method according to claim 7 wherein the shadow queue is configured to receive associated data and to provide an output responsive thereto using a constant ROM coupled to the output of the shadow queue.

11. A method according to claim 7 wherein the associated data includes a control field associated with the associated data and wherein the step of outputting the data associated with the micro-operation from the shadow queue in a second cycle is perfected by selecting a constant output from the shadow queue wherein the selector output is synchronized with its associated processed micro-operation.

12. A pipelined processor comprising:

a main memory for storing instructions and data;

a cache memory for storing frequently accessed data;

a system bus coupled to the main memory and the cache memory;

a main memory control coupled to the system bus;

an instruction fetch unit coupled to the system bus for fetching instructions and;

a decoder unit for decoding instructions fetched by the instruction fetch unit, the decoder unit including:

a split queue system for a decoder, the split queue system being configured to decode an instruction's micro-operations separate from each micro-operation's associated data, said split queue system comprising:

a main queue coupled to receive a micro-operation from a decoder;

a next processing stage coupled to receive the micro-operation issued from the main queue and to process the micro-operation in one cycle to provide a processed micro-operation;

a shadow queue coupled to receive the micro-operation's associated data from the decoder; and a control circuit coupled to the main queue and the shadow queue for issuing the micro-operation from the main queue in a first cycle and issuing data associated with the micro-operation in a second cycle so that the data is synchronized with its associated processed micro-operation.

13. A parallel processor according to claim 12 wherein the split queue system further includes:

a branch address calculator configured to calculate branch addresses associated with associated data and coupled to the shadow queue to provide the micro-operation's associated data.

14. A parallel processor according to claim 12 wherein the split queue system further includes:

a control field associated with the associated data;

a constant ROM coupled to the output of the shadow queue and configured to receive the associated data and provide a constant output responsive thereto; and a selector configured to select one of the constant outputs and the data, which selector output is synchronized with its associated processed micro-operation in response to the control field.

15. A parallel processor according to claim 12, wherein the shadow queue system further includes a plurality of inputs and a plurality of outputs and has a larger number of inputs than outputs and wherein each output is coupled to a constant ROM to receive associated data and to provide an output in response thereto.

\* \* \* \* \*

UNITED STATES PATENT AND TRADEMARK OFFICE
CERTIFICATE OF CORRECTION

| | | |
|---|---|---|
| PATENT NO. | : | 5,668,985 |
| DATED | : | September 16, 1997 |
| INVENTOR(S) | : | Carbine et al. |

It is certified that error appears in the above-identified patent and that said Letters Patent is hereby corrected as shown below:

Column 1, line 1, and the Title Page at [54] delete "INTSTRUCTIONS" and insert --INSTRUCTIONS--

In column 4 at line 27 delete "operarid" and insert --operand--

In column 18 at line 40 delete "aboves" and insert --above--

Signed and Sealed this

Thirty-first Day of March, 1998

*Attest:*

BRUCE LEHMAN

*Attesting Officer*   Commissioner of Patents and Trademarks